United States Patent [19]

Hackert

[11] 4,216,046
[45] Aug. 5, 1980

[54] MANUFACTURE OF ARTICLES OF POLYVINYL CHLORIDE FOIL WITH SEALED-IN REINFORCEMENT MATERIAL

[75] Inventor: Benjamin M. Hackert, Hillegom, Netherlands

[73] Assignee: Draka Plastics B.V., Amsterdam, Netherlands

[21] Appl. No.: 29,836

[22] Filed: Apr. 13, 1979

[30] Foreign Application Priority Data

Apr. 26, 1978 [NL] Netherlands .......................... 7804451

[51] Int. Cl.$^2$ ...................... B29C 27/02; B29C 27/04
[52] U.S. Cl. ..................................... 156/252; 156/273; 156/290; 156/301; 156/477 B; 281/21 R; 281/29; 156/292; 156/308.4
[58] Field of Search ................... 156/252, 273, 87, 290, 156/300, 301, 309, 251, 212, 213, 477 B; 281/21 R, 23, 29

[56] References Cited

U.S. PATENT DOCUMENTS

| | | | |
|---|---|---|---|
| 2,478,132 | 8/1949 | Schade | 156/273 |
| 2,647,071 | 7/1953 | Schade | 156/252 |
| 2,788,041 | 4/1957 | Carver | 281/29 |
| 2,831,706 | 4/1958 | Miller | 156/477 B |
| 2,977,271 | 3/1961 | Lutwack | 156/301 |
| 3,398,036 | 8/1968 | Viesturs | 156/290 |
| 3,953,056 | 4/1976 | Roberts | 281/29 |

FOREIGN PATENT DOCUMENTS

1077182 3/1960 Fed. Rep. of Germany .
2075938 10/1971 France .
1437535 5/1976 United Kingdom .

*Primary Examiner*—Michael G. Wityshyn
*Attorney, Agent, or Firm*—Spencer & Kaye

[57] ABSTRACT

A method of manufacturing articles of softened polyvinyl choride reinforced with a reinforcement material. The method includes the steps of coating one surface of each of two perforated polyvinyl chloride foils with a terpolymer ot vinyl chloride, vinyl acetate and an unsaturated carboxylic acid bringing the coated surface of each of the foils into contact with an opposite surface of said reinforcement material, sealing the portions of the foils situated along the edges of the reinforcement material in a high frequency field to form sealed seams and pressing the foils and interposed reinforcing material at an elevated temperature and pressure to secure the foils to the reinforcement material.

5 Claims, 2 Drawing Figures

MANUFACTURE OF ARTICLES OF POLYVINYL CHLORIDE FOIL WITH SEALED-IN REINFORCEMENT MATERIAL

BACKGROUND OF THE INVENTION

This invention relates to a method of manufacturing reinforced articles of softened polyvinyl chloride. In particular, an assembly formed by a layer of reinforcement material having on each side at least one foil of softened polyvinyl chloride is introduced into a high-frequency field, and the parts of the foils situated along the edges of the reinforcement material are sealed together to form seams.

The reinforcement material is plate-shaped, may consist of several parts and generally has fibrous structure. For example, the reinforcement material may be composed of paper, cardboard or a plastic such as synthetic foam, cheap, moisture-sensitive but reasonably rigid cardboard being frequently used as a reinforcement material in articles made of softened polyvinyl chloride.

According to a conventional method of manufacturing such articles, one or several parts or sheets of reinforcement material are laid between foils of softened polyvinyl chloride. This assembly, which has a sandwich structure, is then placed in a high-frequency sealing machine in which the sheets of reinforcement material situated between the foils are sealed-in along the edges by means of a high-frequency electric field. For this purpose, the polyvinyl chloride foils must extend beyond the peripheral edges of the reinforcement material so as to enable the sealing together of the polyvinyl chloride foils along the edges. When several sheets of reinforcement material are used, some space or clearance is present between the various sheets.

The resulting flat sandwich product with sealed-in parts or sheets of reinforcement material, sometimes termed plano product, is then mechanically given the desired shape or configuration determined by the final product, for example, by folding.

The kind and quality of high-frequency field generated in the sealing machine is determined by the electrodes used therein. By varying the shape of the electrodes, the sealed seams obtained in the plano product can be varied. This means that the shape of the sealed-in parts of reinforcement material may differ considerably in accordance with the electrodes used so that a variety of articles can be manufactured from the plano product. Examples of such articles are packaging or storage units; for example, portfolios, cases, handbags, boxes, suitcases and the like.

After the shaping of the articles, further mechanical components of metal or synthetic resin such as hinges, closures, rings or clamps are nearly always provided. These components are fixed in the article in question by means of rivets or staples, the rivet or staple perforating the assembly of foils with intermediate reinforcement material.

The disadvantage of the method described is that air can penetrate into the various sealed-in compartments via the perforations caused by the staples and rivets so that the foil of softened polyvinyl chloride surrounding the reinforcement material starts showing ruffles. In the absence of perforations, the polyvinyl chloride foils will also show undulations after a shorter or longer period of time as a result of heating, for example, by sunlight, so that the product becomes unsalable.

According to another method, each foil is provided on one side over a portion of its surface with a layer of aqueous glue. The size and shape of any portion of the surface which is provided with the layer of glue must accurately correspond to the size and shape of the sheet of reinforcement material used. The sheets of reinforcement material are accurately disposed on the surface of one of the two foils provided with glue in such manner that the glued portions of the foil are exactly covered by the reinforcement material. The second foil is then provided in the same accurate manner over the surface of the reinforcement material remote from the first foil, with the layer of glue facing the reinforcement material. The portions of the two foils not provided with glue are then sealed together along the edges of the reinforcement material in a high-frequency field. The whole process is carried out in an expensive automatic glue-sealing machine which is designed especially for this purpose.

The advantage of this method over the first-mentioned method is that ruffles of the foils are substantially suppressed, even if comparatively thin foils of softened polyvinyl chloride are used.

A disadvantage of the method is the high purchasing price of the required automatic glue-sealing machine. A further disadvantage is that, as already described above, the layer of glue has to be provided very accurately. If the layer of glue extends to just beyond the reinforcement material, an imperfect seal is obtained; that is, a sealed seam having too low a sealing strength so that the seal can easily be broken. If, on the other hand, the layer of glue does not extend entirely up to the edges of the reinforcement material, an air-filled space will be present between the sealed seam and the foils glued to the reinforcement material after the sealing process. As a result, ruffles will be formed in the polyvinyl chloride foils under the influence of pressure and temperature variations of the ambient air and furthermore delamination of the glued foils may take place. Another disadvantage of this method is that when switching from one product to another, the operations required for readjustment of the automatic glue-sealing machine are time-consuming and in addition can be carried out only by highly skilled technical personnel. Consequently, the method described is less suitable for manufacturing products in comparatively small quantities.

SUMMARY OF THE INVENTION

Applicants have developed a method which does not exhibit the above-mentioned disadvantages. In this method, perforated polyvinyl chloride foils are used wherein the entire surface facing the reinforcement material is provided with a coating containing a terpolymer of vinyl chloride, vinyl acetate and an unsaturated carboxylic acid. After the parts of the foils situated along the edges of the reinforcement material have been sealed together in a high-frequency field to form sealed seams, the parts of the foils situated between the sealed seams are glued to the surface of the reinforcement material at elevated temperature and pressure.

The method according to the invention permits manufacturing products having excellent quality with simple and non-expensive apparatus. This makes economic manufacture of a relatively small quantity of a given product possible. For example, the method according to the invention may be implemented using only a simple high frequency sealing machine and a press.

With regard to simplicity, the method according to the invention can best be compared with the above-described first method in which foils not having a layer of glue are used and in which the edges of the foils are welded in a high frequency sealing machine albeit, in the present invention, a simple after-treating pressing process is necessary.

The perforated foils of softened polyvinyl chloride which are used in the invention and which are provided on one side with the above-mentioned terpolymer can be manufactured in a simple manner. For example, the perforated foil may be made by unwinding a long rolled-up foil in a continuous process and passing it below spraying or nebulizing apparatus in which a solution or dispersion of the above-mentioned terpolymer in a suitable solvent is nebulized on the surface of the foil track by means of nozzles. A suitable solvent is an organic liquid such as ethyl acetate or methyl ethyl ketone. The terpolymer may also be provided on the foil by means of a pressure process using pressure rollers. The concentration of the terpolymer in the solvent is not restricted to narrow limits and in general is from 10 to 25% by weight. The foil provided with the terpolymer is then passed through a drying zone in which most or all of the solvent is sucked off at elevated temperature. The foil which is then ready for use is wound on a storage reel.

The layer thickness of the provided terpolymer is small, preferably from 1 to 5 $\mu$m.

The foil provided with the above-mentioned terpolymer remains stable for a long period of time and does not show signs of quality deterioration during prolonged storage at elevated temperature of approximately 70° C. The terpolymer provided on the foil is resistant to migration of softeners from the softened polyvinyl chloride foil even if a softener-sensitive solvent is used during application of the terpolymer.

The terpolymer surface keeps its non-sticky characteristic after prolonged storage. With regard to ease of processing, the foil provided with a terpolymer can be compared with a polyvinyl chloride foil not provided with a coating.

Another essential property of a foil of softened polyvinyl chloride provided with terpolymer coating is its excellent sealability. Two foils provided with terpolymer can be sealed together by coating their surfaces. The sealing strength of the resulting sealed seam is significantly higher than the tensile strength of the softened foil so that the sealed seam cannot be "peeled". This good sealability which corresponds to that of an uncoated foil, permits use of a foil which is provided with the terpolymer coating throughout its surface.

It is consequently not necessary or desired in practising the invention to use an expensive machine such as an automatic glue-sealing machine with which sharply defined surface parts can be provided with a coating. The time-consuming and expensive readjusting operations required when such a machine is used are not necessary. Also, the above-described disadvantages resulting from an incorrect readjustment operation, for example, ruffles and delamination of the foil, do not occur in the method according to the invention.

When carrying out the invention, the required layers of reinforcement material are placed in the desired pattern between two foils which have their coated surfaces facing each other. This sandwich assemby is passed, for example, via a transport belt, into a high-frequency sealing machine and the foils are then sealed against each other along the edges of the inlaid reinforcement material under the influence of the applied high-frequency field. The resulting product with sealed-in reinforcement material is then passed into a press in which the non-sealed foil parts are glued to the reinforcement material under elevated temperature and pressure.

Activation of the terpolymer layer, which is necessary for gluing, must take place through the polyvinyl chloride foil at a temperature of at least 70° C. but preferably not higher than 120° C. It has been found that when so-called decorative polyvinyl chloride foils are used, that is, foils having a structured surface, a comparatively high activation temperature of 110–120° C. is still possible without glossy speckles being formed during the pressing process on the raised foil parts. In such a case, a moderate pressing pressure having a maximum value of 3 kg/cm$^2$ should be used on the product to be activated for a period of not more than 10 seconds. At a lower activation temperature, the pressing pressure and cycle time used are less critical. Depending in part on the foil thickness and the temperature, the pressure may generally vary from 0.5 to 3 kg/cm$^2$. In order to promote the speed of processing the pressure time is preferably chosen to below, and is roughly from 1 to 5 seconds.

The gluing of the foils to the reinforcement material obtained according to the invention is excellent. Life tests have demonstrated that the resulting products do not show any visible deterioration in quality and, in particular, there is no delamination of the foil and reinforcement material after storage for weeks under moist conditions and at temperatures of 60, 70, 80 and 90° C.

As stated, a perforated foil is used; that is, before the gluing process takes place the foil must be perforated. Experiments performed with non-perforated foils and cardboard as a reinforcement material have demonstrated that, although good adhesion between the foil and the cardboard is obtained, excessive pressure occurs as a result of expanding air and water evaporating from the cardboard when the press is opened causing delamination of the cardboard structure in layers.

In the preferred embodiment of the invention, a terpolymer is used containing from 80 to 85 parts by weight of vinyl chloride, from 12.5 to 17.5 parts by weight of vinyl acetate and from 0.5 to 2.5 parts by weight of an unsaturated mono- or dibasic carboxylic acid. Examples of suitable carboxylic acids are monobasic carboxylic acids such as acrylic acid, methacrylic acid or derivatives thereof. Particularly suitable are dibasic unsaturated carboxylic acids, such as maleic acid, itaconic acid or derivatives thereof.

BRIEF DESCRIPTION OF THE DRAWINGS

The invention will now be described in greater detail by way of example, with reference to the following drawing wherein.

DESCRIPTION OF THE PREFERRED EMBODIMENTS

A softened perforated polyvnyl chloride foil having an extended length, a width of 150 cm and a thickness of 0.25 mm was coated on one side by means of a coating process with a 3 $\mu$m thick coating of a terpolymer consisting of 85% by weight vinyl chloride, 14% by weight vinyl acetate and 1% by weight maleic acid. For this purpose, the foil was treated with a solution of the termpolymer in methyl ethyl ketone containing 200 grams of terpolymer per liter, after which the solvent was removed by sucking it off at a temperature of 60° C. The foil provided with this coating can be rolled without sticking of the foil parts and is stable for a long period of time.

Figure 1:
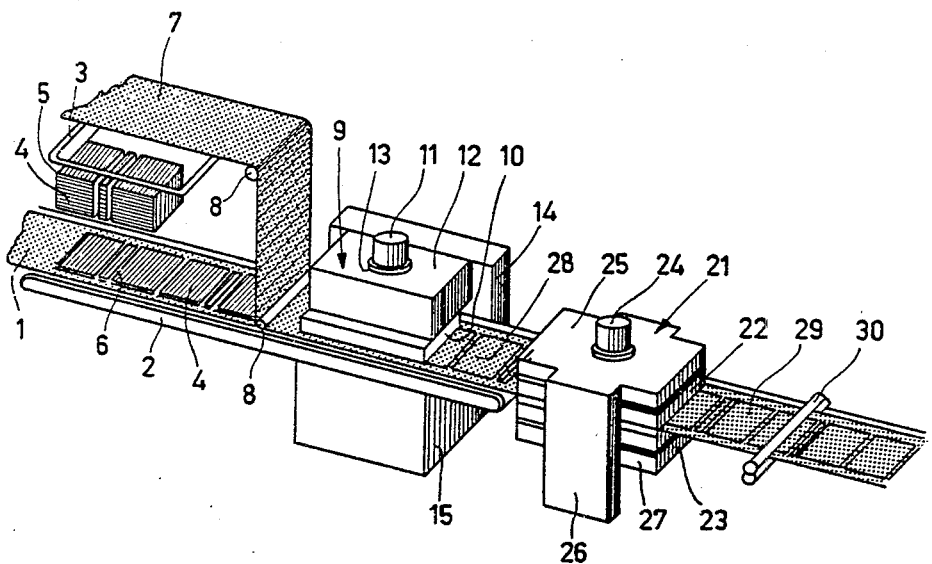
FIG. 1 is a perspective view of a production line for carrying out the method according to the invention.

Apparatus for manufacturing an article reinforced by means of reinforcement material while using the coated polyvinyl chloride foil is shown in FIG. 1.

Reference numeral 1 in FIG. 1 denotes a polyvinyl chloride foil which is provided on its upper surface with a terpolymer coating. The foil 1 is passed below an automatic cardboard inlay machine 3 by means of transport belts 2, which cardboard inlay machine 3 comprises a cardboard store 5 filled with cardboard parts 4. Foil 1 is fed continuously with the cardboard parts 4 on the side of the foil having the terpolymer coating. It is to be noted that the cardboard parts are not contiguous but are provided on the foil path 1 with a significant intermediate space 6 as a result of the operation of the automatic cardboard inlay machine.

A second softened polyvinyl chloride foil 7, which is also provided on one side with a terpolymer coating, is positioned continuously by guide rollers 8 over the first foil 1 provided with cardboard parts 4, the coating of foil 7 engaging the cardboard parts 4. The resulting assembly is further transported by transport belt 2 into an automatic sealing machine 9. The automatic sealing machine 9 comprises a pressure plate 10 of aluminum which is connected on its upper side with a hydraulically operated plunger 11 and is provided on its lower side with narrow brass electrodes (not shown). Plunger 11 passes through guide member 12 which has an aperture 13 and guide member 12 is connected to stand 14 which comprises a supporting member 15. By using a high-frequency current in the narrow brass electrodes a temperature of approximately 180° C. is obtained. At a pressure of approximately 0.5 kg/cm² for 2 to 3 seconds, the foil parts 16 situated along the edges of the cardboard parts 4 (see FIG. 2) are sealed together by means of the current flowing between the brass electrodes.

Figure 2:
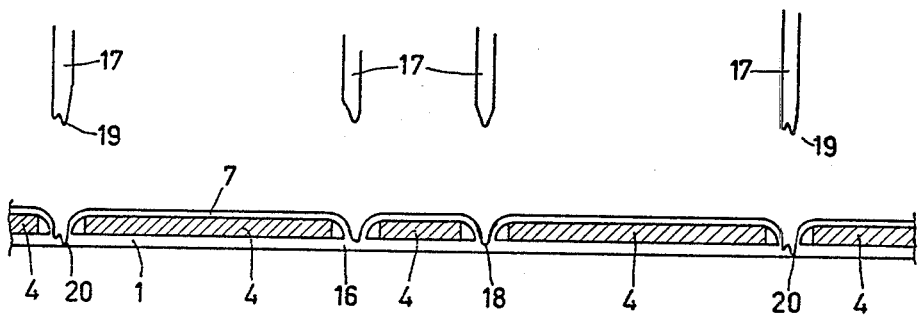
FIG. 2 is a cross-sectional view of an article obtained in accordance with the method.

FIG. 2 shows the resulting sealed product in which for corresponding components the same reference numerals are used as in FIG. 1. The parts 16 of the foils 1 and 7 situated between cardboard parts 4 are sealed by using sealing electrodes 17 while forming sealed seams 18. The outermost sealing electrodes shown in FIG. 2 are provided with a cutting edge 19 so that the resulting sealed seams 18 comprise a groove 20. The sealed product can afterwards be easily torn or separated by tearing along this groove. The thickness of the polyvinyl chloride foils below the grooves is approximately 0.1 mm.

The thus sealed product 28 is introduced into a press 21 (see FIG. 1) between two press plates 22 and 23 heated at 100° C. The product is pressed with a force of 1.5 kg/cm² for 4 seconds, the foils 1 and 7 adhering to the intermediate cardboard parts 4 by means of the terpolymer layers present thereon. The upper press plate 22 is connected to plunger 24 which travels through an opening in guide plate 25 which can be operated hydraulically or pneumatically. Guide plate 25 is connected to stand 26 and the lower plate 23 has a supporting plate 27. The press plates 22 and 23 on their free surfaces, hence facing the sealed product, are provided with a collapsible buffer plate (not shown) which is formed by an open-pored foam plate. The collapsible buffer plate is of considerable importance and presents the advantage that volatile constituents which may be present in the cardboard, for example a moisture as well as enclosed air, can escape via the pores in foils 1 and 7 and via the open foam structure of the buffer plate. Furthermore, the buffer plate has a protective function with respect to the sealed product in that relief printing or surface structure provided on the foils is completely retained. Finally, the buffer plate has the advantage that it compensates for differences in cardboard thickness.

The resulting sealed and glued product 29 is transported by means of rollers 30 and finally separated by tearing along the grooves 20 shown in FIG. 2.

It is to be noted that the foils 1 and 7 are glued to cardboard part 4 in sealed and glued product 29 shown in FIG. 2. The resulting plano product can be folded along the sealed seams between the cardboard part 4 and thereby transformed into a three-dimensional article, for example a portfolio. The desired closures, clamps, rings and the like can be provided in the article by finishing operations.

It will be understood that the above description of the present invention is susceptible to various modifications, changes and adaptations, and the same are intended to be comprehended within the meaning and range of equivalents of the appended claims.

What is claimed is:

1. A method of manufacturing articles of softened polyvinyl chloride reinforced with reinforcement material comprising the steps of
   coating one surface of each of two perforated foils of said softened polyvinyl chloride with a terpolymer of vinyl chloride, vinyl acetate and an unsaturated carboxylic acid,
   bringing the coated surface of each of said foils into contact with an opposite surface of said reinforcement material,
   sealing the portions of said foils situated along the edges of said reinforcement material in a high frequency field to form sealed seams, and
   securing the portions of said foils situated between said seams to the surface of said reinforcement material by pressing said foils and reinforcement material at elevated temperature and pressure.

2. The method as claimed in claim 1, characterized in that the terpolymer contains from 80 to 85 parts by weight of vinyl chloride, from 12.5 to 17.5 parts by weight of vinyl acetate and from 0.5 to 2.5 parts by weight of an unsaturated mono- or dibasic carboxylic acid.

3. The method as claimed in claim 1 or 2, characterized in that the unsaturated carboxylic acid is selected from the group consisting of maleic acid, itaconic acid or derivatives thereof.

4. The method as claimed by claim 1, characterized in that the layer thickness of the coating is from 1 to 5 μm.

5. The method as claimed in claim 1 or 2 wherein said foils and reinforcement material are pressed at a temperature of about 100° C. and a pressure of about 1.5 kg/cm².

* * * * *